UNITED STATES PATENT OFFICE.

MATHIEU SOUVIELLE, OF PARIS, FRANCE.

DISINFECTANT.

No. 887,707.  Specification of Letters Patent.  Patented May 12, 1908.

Application filed October 19, 1906. Serial No. 339,672.

*To all whom it may concern:*

Be it known that I, MATHIEU SOUVIELLE, a citizen of France, residing at Paris, France, have invented new and useful Improvements in Disinfectants, of which the following is a specification.

This invention relates to improvements in compounds for preventing and destroying the germs of contagious and infectious diseases.

All epidemic diseases are either contagious, infectious or zymotic, and may be transmitted in various manners, so that it is very desirable that some agent should be provided whereby the spread of such diseases should be prevented. I have discovered that by the employment of the agents or compounds hereinafter described, either by burning, spraying or flushing in infected places, or by taking into the system in any suitable manner, the causes of contagious and other like diseases are eradicated, or their effects rendered harmless.

The object of this invention, therefore, is to combine and arrange suitable prophylactic disinfecting and therapeutic agents that they may be readily burned in suitable quantities to give off in vapor the agents active and desired for the ends sought, or they may be sprayed in infected places, thereby destroying the germs of contagious and infectious diseases, or preventing the spread of such diseases, or, furthermore, by immersion in water to impregnate the water therewith, so that it becomes, when drunk, a preventive agent. In accomplishing this I use as a base agent for the composition, vegetable tar when it is to be taken internally, or vegetable or coal tar, or a mixture of both, when the composition is burned or sprayed. With either the vegetable or coal tar or a mixture of both is combined, as circumstances may require, sodium chlorid, calcium chlorid and sulfur, and as an example of the proportions of the ingredients of the composition is about as follows: 20 pounds of tar; 3 oz. of sodium chlorid; 3 oz. of calcium chlorid; 6 oz. of sulfur. Such composition, when burned, will yield vapors beneficial to the already affected, while sulfurous acid gas will be given off, which is highly destructive to, in fact, totally incompatible with germ life, either animal or vegetable.

When the composition is utilized for spraying or flushing purposes the ingredients thereof are combined with a suitable liquid in the necessary proportions. By way of example such solution may be either lime water or an aqueous solution of bichlorid of mercury, or both, preferably the bichlorid of mercury solution, and 85% of this solution is used with the other ingredients which constitute the composition and then heated to the boiling point, which causes a unification of the ingredients.

For the destruction of floating germ life and the prevention of the spread of diseases due to the dissemination of such germs, it is better that the vapors of such composition arising from its combustion should be used and the combustion extended over some period of time to insure for such time the impregnating of the atmosphere with such germ-destroying vapors. To accomplish this a roll or plate of a suitable base is impregnated or covered with such a composition. The roll or plate may be of any desired size—quite small for use in a room or building, of sufficient size to furnish a base for a large amount of the material for combustion in the open air. While this base may be metallic with a coating of the composition thereon, or mineral, as asbestos cloth or fiber saturated therewith, a cheap and preferable form is a strip or shaving of porous or bibulous wood thoroughly impregnated with the composition so that all may burn for some moments of time and thoroughly fill the apartment or building with the germ-destroying vapors. Such a roll may also be used to prepare a medicated water having properties imparted to it thereby which are destructive of germ life and the effects of germ life in individual cases. In this instance the roll is thrown into a receptacle containing water and allowed to remain there for a while, preferably when the medicated water is made the tar, sodium chlorid and sulfur are only used, but if desirable the calcium chlorid can also be used. By its action the water is purified and it becomes impregnated with the preventive and prophylactic properties of the composition, and when used as a beverage, aids in the curing of germ diseases and in the prevention of infection and contagion, and, furthermore prepares the mucous membrane of the human system to resist any further infection. In addition to its uses in a limited space, such as an apartment or building, it may be used in large quantities throughout an entire district, village or city, and is particularly adapted for the flushing of sewers, and when used in this connection a requisite amount of the prophylactic material in the form of a liquid is flushed through the sewer pipes so that the disinfection can take place upon the walls of the sewers or pipes. When disinfecting a large district, village or city the prophylactic material is sprayed so as to destroy the germs already existing in the dust and to prevent their germination, as well as their evaporation, or, it can be burned if desired, thereby producing germ-destroying gases.

If for some hours at the first and then for brief periods for several successive days, the prophylactic material be burned at frequent points in an infected city or district the vapors mingling with the atmosphere will destroy the life of the germs therein mingled and floating, as well as prevent germination and evaporation, and also prevent the further infection of the city or district. In such cases it may be advantageous to use gun powder with which an additional percentage of free sulfur has been mixed, the sulfur retarding the combustion of the gun powder, while the gun powder insures the combustion of the added sulfur and the consequent liberation and elimination of a larger percentage of sulfurous acid gas.

Although it has been stated that the invention is used for disinfecting infected spots, buildings, districts, villages and cities, it is also thoroughly applicable for use for the navy and merchant marines, as well as in public or private conveyances.

When the material is used for burning purposes it can be put up in rolls or packages, which constitutes it a new article of manufacture for domestic or household use, or when used for disinfection of large districts it is put up in bulk with some base which insures slow combustion. When used for spraying or flushing purposes in liquefied form it is packed in varying sized receptacles according to the quantity required.

The herein described compound is an improvement upon Letters Patent No. 342,231, dated May 18, 1886, in the following features: The addition of sodium chlorid and calcium chlorid and extending of the uses of the disinfectant for spraying purposes and the flushing of sewers, streets, passages, steamers, trains, and vehicles, and all public conveyances.

What I claim is—

1. A composition of matter for prophylactic, disinfecting and therapeutic purposes comprising twenty pounds of tar, three ounces of sodium chlorid, three ounces of calcium chlorid, and six ounces of sulfur.

2. A composition of matter for prophylactic disinfecting and therapeutic purposes comprising vegetable tar, sodium chlorid, calcium chlorid, sulfur, and a suitable liquid.

3. A composition of matter for prophylactic, disinfecting and therapeutic purposes comprising calcium chlorid, sulfur, tar and a suitable liquid.

In testimony whereof I have hereunto set my hand in presence of two subscribing witnesses.

MATHIEU SOUVIELLE.

Witnesses:
  N. L. BOGAN,
  SIGMUND J. BLOCK.